United States Patent
Mermoud et al.

(10) Patent No.: US 9,436,917 B2
(45) Date of Patent: Sep. 6, 2016

(54) ACCELERATING LEARNING BY SHARING INFORMATION BETWEEN MULTIPLE LEARNING MACHINES

(71) Applicant: Cisco Technology, Inc., San Jose, CA (US)

(72) Inventors: Grégory Mermoud, Veyras (CH); Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 13/937,631

(22) Filed: Jul. 9, 2013

(65) Prior Publication Data

US 2014/0222726 A1    Aug. 7, 2014

Related U.S. Application Data

(60) Provisional application No. 61/761,103, filed on Feb. 5, 2013.

(51) Int. Cl.
*G06N 99/00* (2010.01)
*H04L 29/12* (2006.01)

(52) U.S. Cl.
CPC ............. *G06N 99/005* (2013.01); *H04L 29/12* (2013.01); *H04L 61/00* (2013.01)

(58) Field of Classification Search
None
See application file for complete search history.

(56) References Cited

U.S. PATENT DOCUMENTS

| | | | |
|---|---|---|---|
| 2006/0133389 A1* | 6/2006 | Wybenga et al. | ............ 370/401 |
| 2006/0227724 A1 | 10/2006 | Thubert et al. | |
| 2007/0112955 A1 | 5/2007 | Clemm et al. | |
| 2008/0228940 A1 | 9/2008 | Thubert | |
| 2012/0307825 A1 | 12/2012 | Hui et al. | |
| 2013/0013809 A1 | 1/2013 | Vasseur et al. | |
| 2013/0219478 A1 | 8/2013 | Mahamuni et al. | |
| 2013/0236002 A1* | 9/2013 | Jennings et al. | ......... 379/265.12 |

OTHER PUBLICATIONS

Farahnakian, et al., "Adaptive Reinforcement Learning Method for Networks-on-Chip", International Conference on Networked Embedded Computer Systems (SAMOS), Jul. 2012, pp. 236-243, IEEE, SAMOS, Greece.

Farahnakian, et al., "Optimized Q-Learning Model for Distributing Traffic in On-Chip Networks", 3rd International Conference on Networked Embedded Systems for Every Application (NESEA), Dec. 2012, 8 pages, IEEE, Liverpool, England.

(Continued)

*Primary Examiner* — Kakali Chaki
*Assistant Examiner* — Michael Zidanic
(74) *Attorney, Agent, or Firm* — Parker Ibrahim & Berg LLC; James M. Behmke; Stephen D. LeBarron

(57) ABSTRACT

In one embodiment, variables maintained by each of a plurality of Learning Machines (LMs) are determined. The LMs are hosted on a plurality of Field Area Routers (FARs) in a network, and the variables are sharable between the FARs. A plurality of correlation values defining a correlation between the variables is calculated. Then, a cluster of FARs is computed based on the plurality of correlation values, such that the clustered FARs are associated with correlated variables, and the cluster allows the clustered FARs to share their respective variables.

20 Claims, 7 Drawing Sheets

ARCHITECTURE FOR THE INFORMATION SHARING BETWEEN FARs

(56) References Cited

OTHER PUBLICATIONS

Förster, et al., "Machine Learning Techniques Applied to Wireless Ad-Hoc Networks: Guide and Survey", 3rd International Conference on Intelligent Sensors, Sensor Networks and Information, Dec. 2007, pp. 365-370, IEEE, Melbourne, Qld., Australia.

Littman, et al., "A Distributed Reinforcement Learning Scheme for Network Routing", Internet Citation: http://www.dtic.mil/docs/citations/ada270600, retrieved May 7, 2014, 7 pages.

Obal II, et al., "Detecting and Exploiting Symmetry in Discrete-State Markov Models", 12th Pacific Rim International Symposium on Dependable Computing (PRDC), Dec. 2006, pp. 26-38, IEEE, Riverside, CA.

Soliman, et al., "Notification of Transmittal of the International Search Report and the Written Opinion of the International Searching Authority, or the Declaration", Patent Cooperation Treaty, International Application No. PCT/US2014/014694, mailed May 16, 2014, 12 pages, European Patent Office, Rijswijk, Netherlands.

Dasgupta, et al., "A Pre-Processing Framework Component of Distributed Intelligence Architectures", U.S. Appl. No. 61/761,124, filed Feb. 5, 2013, 30 pages, U.S. Patent and Trademark Office.

Mermoud, et al., "Accelerated Learning by Sharing Information Between Multiple Learning Machines", U.S. Appl. No. 61/761,103, filed Feb. 5, 2013, 27 pages, U.S. Patent and Trademark Office.

Vasseur, et al., "Learning Machine Based Detection of Abnormal Network Performance", U.S. Appl. No. 61/761,117, filed Feb. 5, 2013, 39 pages, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

Farahmand, et al., "Set-Membership Constrained Particle Filter: Distributed Adaptation for Sensor Networks", IEEE Transactions on Signal Processing, vol. 59, No. 9, Sep. 2011, pp. 4122-4138.

Jumonji, et al., "A Novel Distributed Genetic Algorithm Implementation with Variable Number of Islands", IEEE Congress on Evolutionary Computation (2007), pp. 4698-4705.

\* cited by examiner

A BAYESIAN NETWORK REPRESENTING THE JOINT PROBABILITY DISTRIBUTION OVER THREE RANDOM VARIABLES; X, Y, AND Z

ACCELERATING LEARNING BY SHARING INFORMATION BETWEEN MULTIPLE LEARNING MACHINES

RELATED APPLICATION

The present invention claims priority to U.S. Provisional Application Ser. No. 61/761,103, filed Feb. 5, 2013, entitled "ACCELERATED LEARNING BY SHARING INFORMATION BETWEEN MULTIPLE LEARNING MACHINES", by Mermoud, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
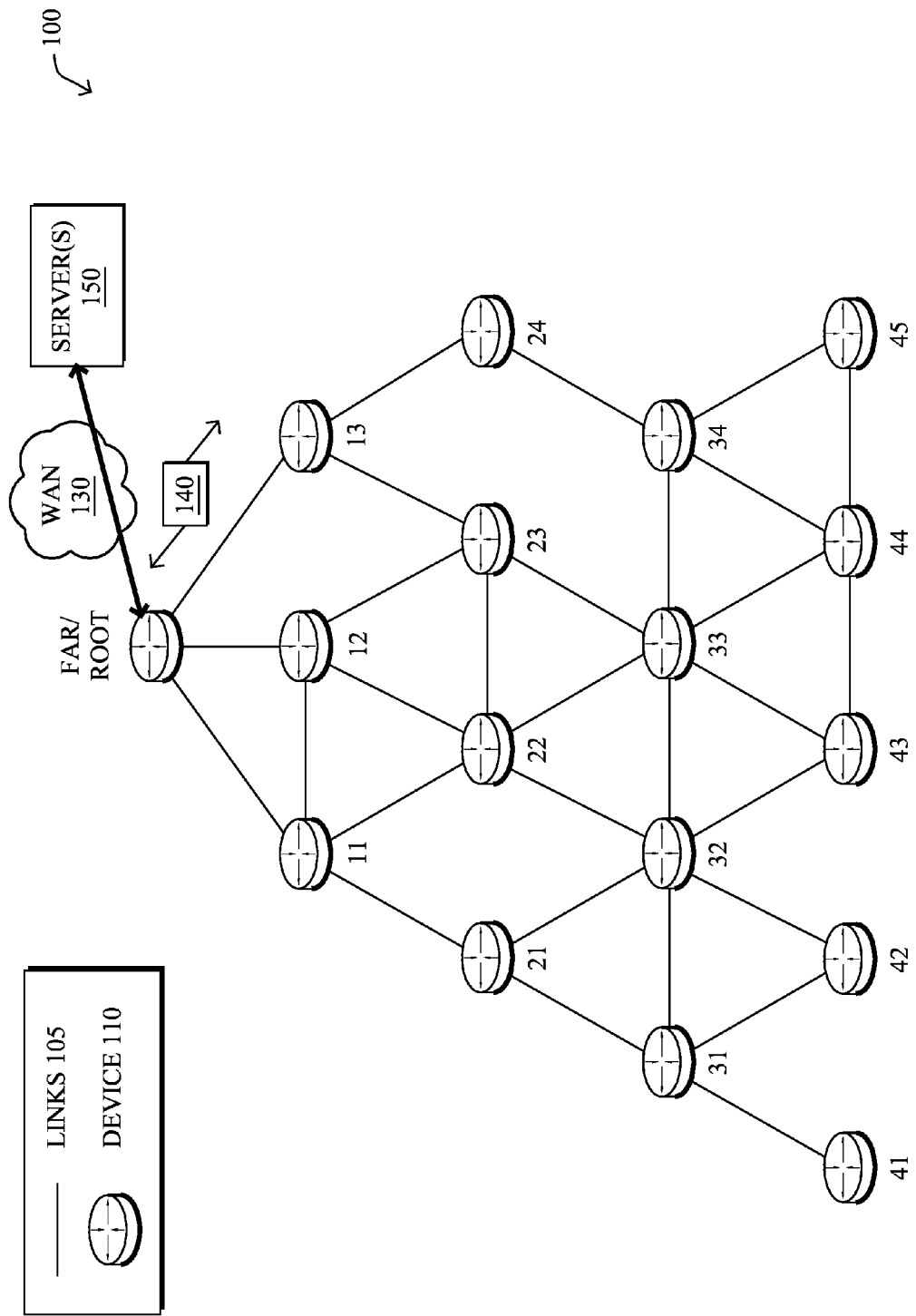
FIG. 1 illustrates an example communication network.

According to one or more embodiments of the disclosure, techniques are shown and described relating to accelerated learning by sharing information between multiple learning machines. In one embodiment, variables maintained by each of a plurality of Learning Machines (LMs) are determined. The LMs are hosted on a plurality of Field Area Routers (FARs) in a network, and the variables are sharable between the FARs. A plurality of correlation values defining a correlation between the variables is calculated. Then, a cluster of FARs is computed based on the plurality of correlation values, such that the clustered FARs are associated with correlated variables, and the cluster allows the clustered FARs to share their respective variables.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus.

WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
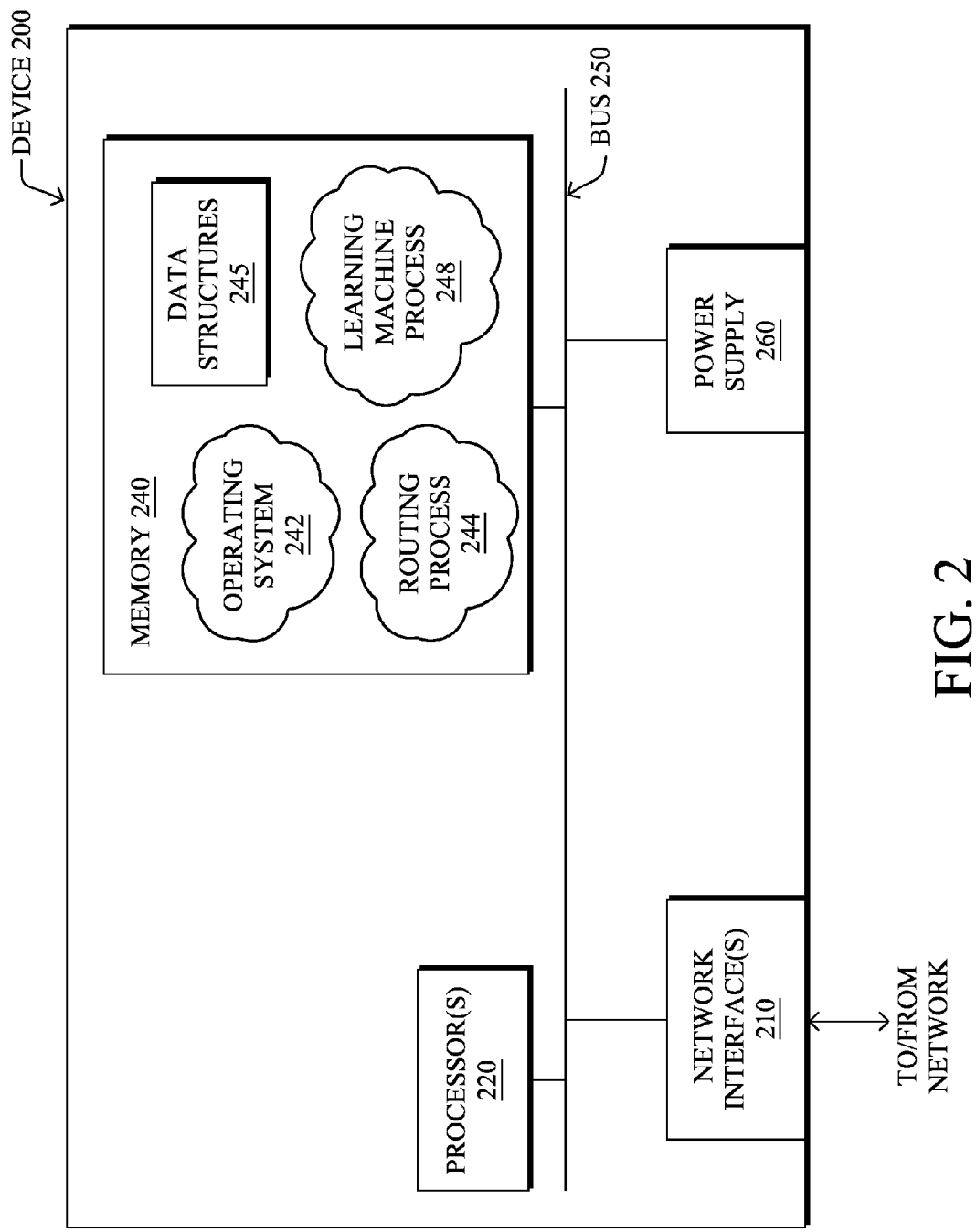
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
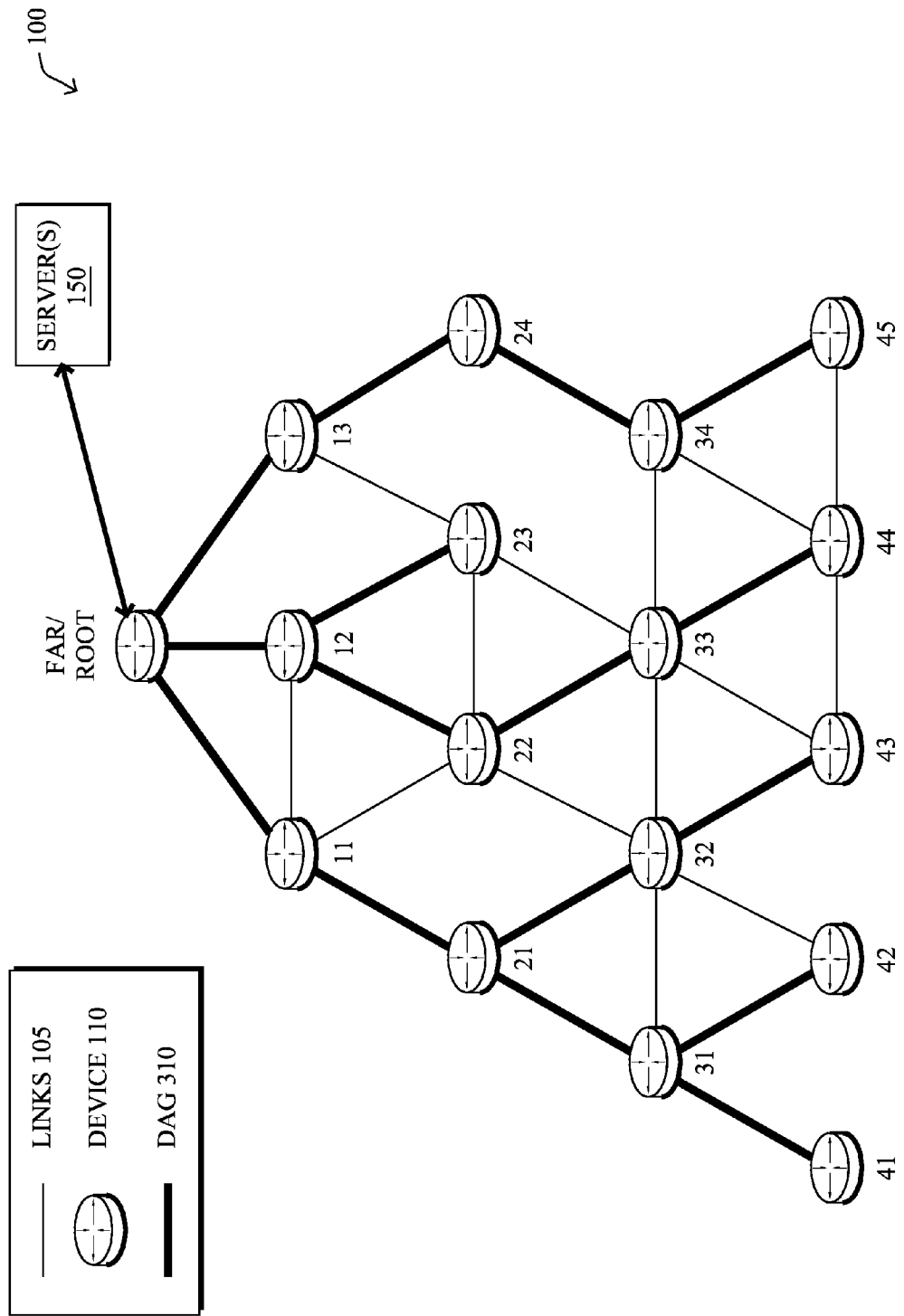
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(Y|X) \quad \text{(Eq. 1)}$$

Figure 4:
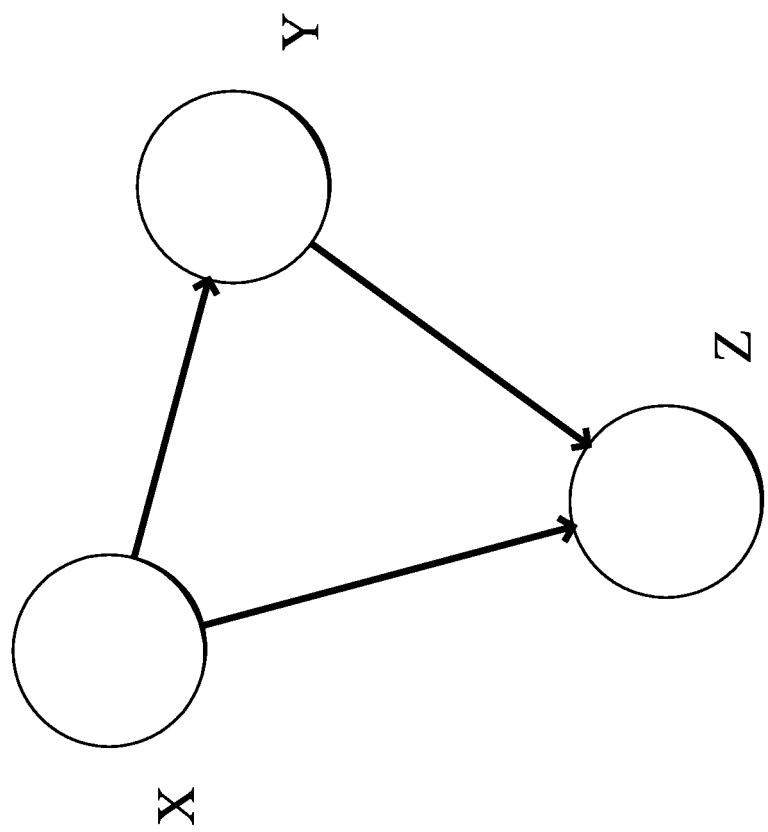
FIG. 4 illustrates an example Bayesian network.

The conditional probabilities in Eq. 1 are given by the edges of the graph in FIG. 4. In the context of LMs, BNs are used to construct the model M as well as its parameters.

The techniques herein are directed at accelerating the learning process of LM-enabled FARs. Indeed, many LMs are using search heuristics such as genetic algorithms, particle swarm optimization, or gradient descent for exploring large, multi-dimensional solution spaces. In such settings, sharing information about their findings allows for a much faster convergence, and better results overall. In the techniques herein, an architecture is specified as well as a series of mechanisms for dynamically sharing information between LMs hosted on FARs in a large-scale FAN, thus dramatically improving the performance of the overall LM-based architecture.

Said differently, the techniques herein introduce an architecture for sharing information between similar LMs running on different FARs in a constrained environment. This architecture specifies an approach whereby an agent called the Distributed Learning Coordinator (DLC) that dynamically computes clusters of FAR that host Learning Machines that benefit from sharing knowledge. The DLC takes into account the correlation between sharable variables used by the set of LMs in addition to available network resources to compute clusters thanks to the dynamic interaction with the NMS. Also, a feed-back mechanism is also used to dynamically adjust the computation of clusters.

In one embodiment, variables maintained by each of a plurality of Learning Machines (LMs) are determined. The LMs are hosted on a plurality of Field Area Routers (FARs) in a network, and the variables are sharable between the FARs. A plurality of correlation values defining a correlation between the variables is calculated. Then, a cluster of FARs is computed based on the plurality of correlation values, such that the clustered FARs are associated with correlated variables, and the cluster allows the clustered FARs to share their respective variables Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, the techniques herein enable information sharing between LM-enabled FARs. A first aspect of the techniques is a specification of the type of LM that it supports. Any LM can be viewed as a computational entity that maintains the values of a series of variables or data structures, and update them as new empirical data are obtained from the network (e.g., node properties and metrics, traffic measures, etc.).

First, the techniques herein distinguish between two types of variables: (1) private, PAN-specific variables whose value supposed to be different for each FAR because they make use of some specific properties of the PAN for which the FAR is responsible, and (2) sharable, FAN-wide variables that, in spite of being learned from empirical data, are not PAN-specific, and may be shared between different FARs. In the techniques herein, this partitioning is described in the context of two widely used types of LMs: Bayesian Networks and search heuristics.

As shown in FIG. 4, a Bayesian Network is a graph whose vertices are random variables, which may be either observed (that is, they correspond to input data) or hidden (they need to be inferred from input data using the Bayes theorem). These variables may represent underlying network properties (e.g., traffic, ETX, link stability, etc.) or more abstract quantities (e.g., model parameters). A subset of these hidden variables may be shared between neighboring FARs, if they belong to the FAN-wide category. This is typically the case of hidden variables that represent environmental parameters or networking parameters that are expected to be consistent throughout an entire geographical region (e.g., user behavior, temperature, node failure rate, etc.).

Search heuristics maintain a list of candidate solutions (in the form of individuals described by a genome, in the case of genetic algorithms, or as points or particles in a multi-dimensional solution space in the case of particle swarm optimization or gradient descent, for instance). For instance, in the case of U.S. Provisional Patent Application Ser. No. 61/761,117, entitled "Learning Machine Based Detection of Abnormal Network Performance", filed by Vasseur et al. on Feb. 5, 2013, such a search heuristic is used for exploring the space of non-linear features $f_i(x)$ that make up the function F( ) that maps node properties to an estimate of the QoS of this node. For each solution (e.g., a specific set of features $f_1(x), \ldots, f_n(x)$), one can compute a fitness that denotes how close to the optimum this particular solution is (e.g., the accuracy of the resulting function F( ). At each iteration, the candidate solutions are evaluated, and they are incrementally updated according to their fitness: very good solutions change more slowly than bad solutions, and the latter are updated in such a way that they get closer to good solutions. In parallel settings, each algorithm maintains a set of local candidate solutions, and the algorithm proceeds as defined above. However, to speed up the process, the best solutions are transmitted to neighboring FARs at regular intervals. As a result, each local LM benefits from the findings of other LMs. The techniques herein, therefore, provides an architectural approach to sharing this information, which enables deployment on large-scale FANs for the IoT or other constrained networks.

Figure 5:
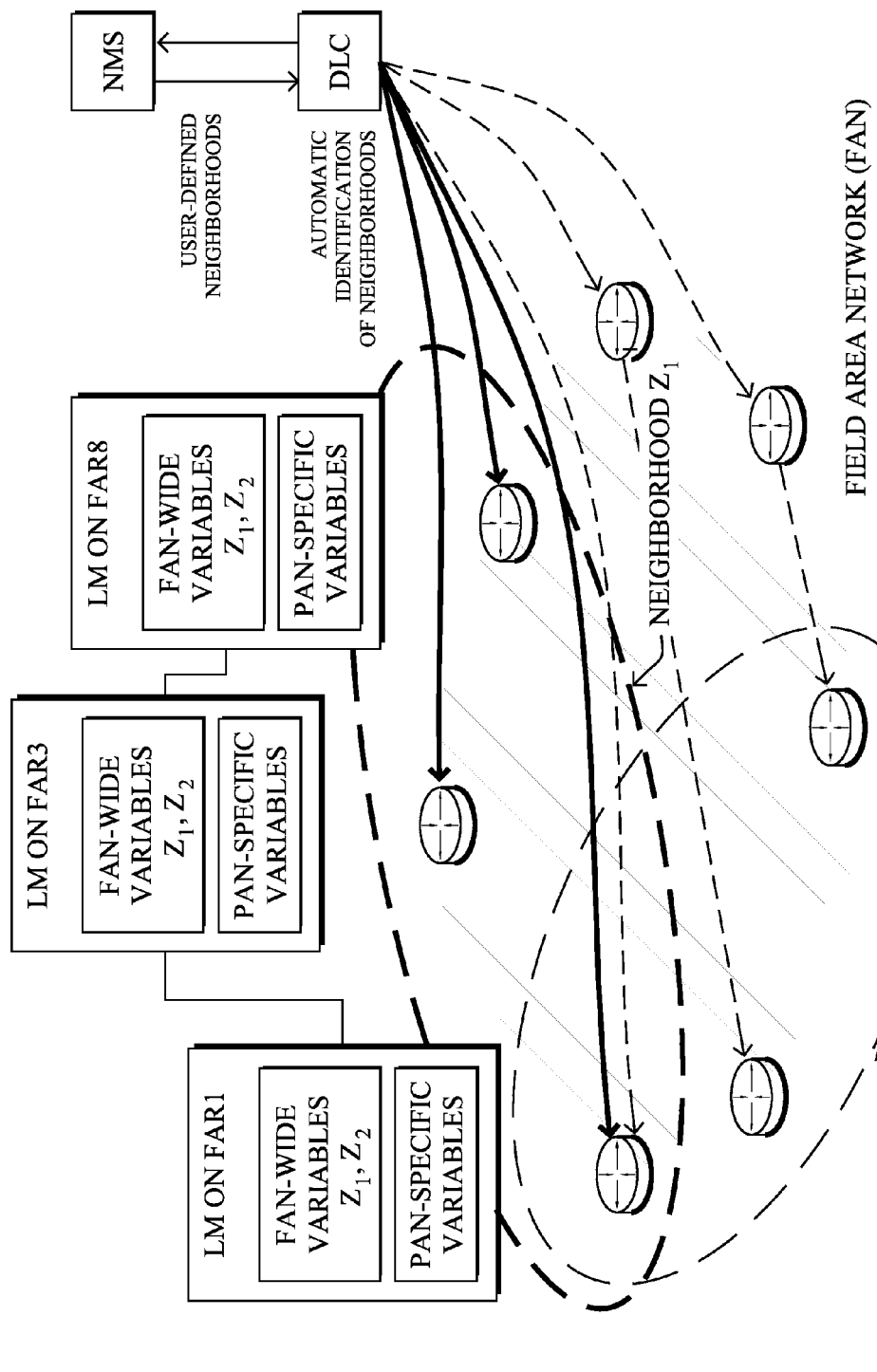
FIG. 5 illustrates an example architecture for information sharing between FARs.

According to one or more embodiments herein, an agent is defined called the Distributed Learning Coordinator (DLC) that is responsible for determining, for each LM running on at least two FARs: (1) the list of variables that must be shared between the different FARs; (2) the computation of clusters of FAR sharing knowledge; and (3) the rate r of learning information between LM hosted on FARs. Reference is made generally to FIG. 5 illustrating an example architecture.

To that end, the DLC periodically probes sharable variables of each FAR using a newly specified unicast or multicast IPv6 message, and evaluates the correlation of shared variables. If this correlation is above a given threshold, the DLC creates a sharing cluster for these variables. Note that correlation is important in order to dynamically form clusters. The notion of a cluster consists in dynamically determining the set of LMs hosted on computation engines (FAR, UCS, etc.) that may benefit from each other. Indeed, if the correlation is high between variables used by a set of FARs, they do benefit from each other by sharing knowledge, and thus the dynamic formation of such clusters is beneficial to the techniques herein.

Figure 6:
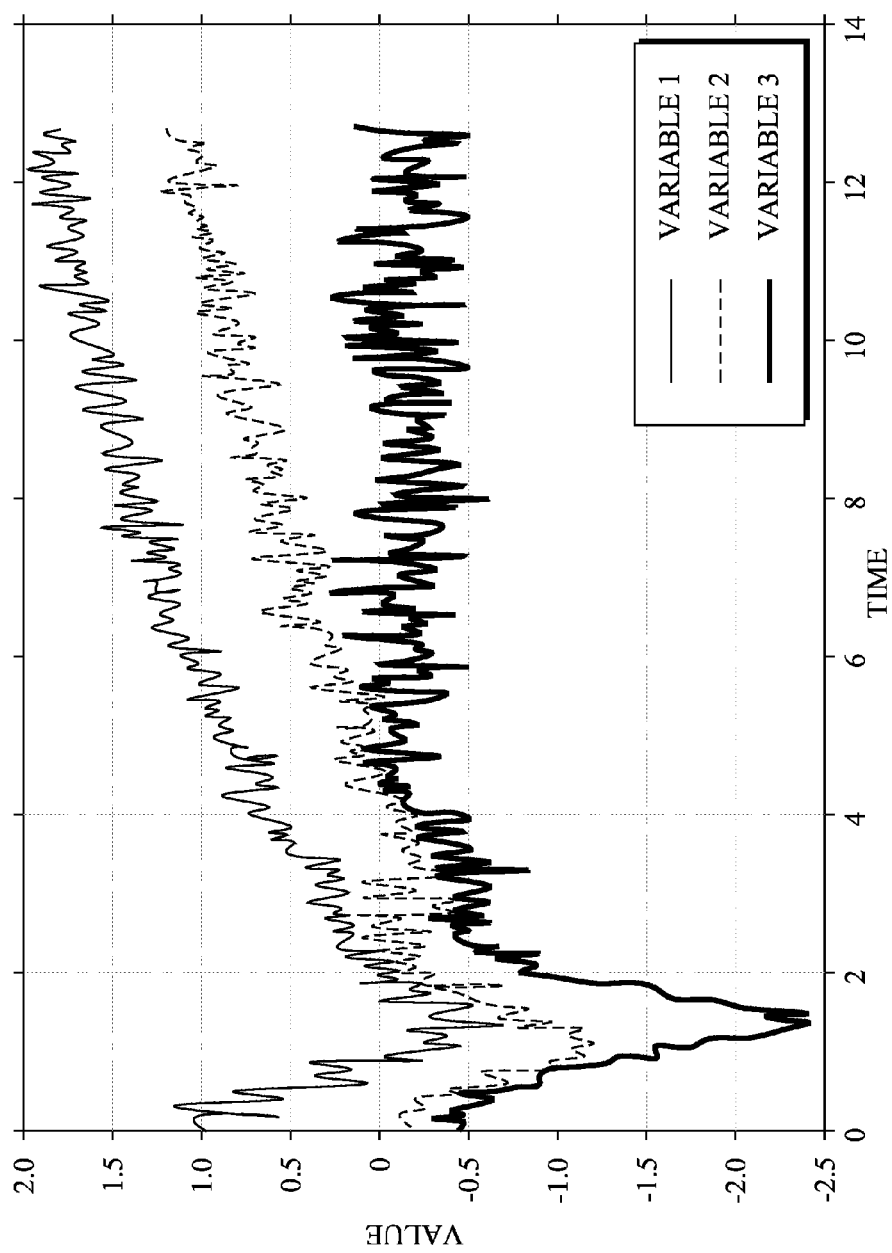
FIG. 6 illustrates an example time evolution of three random variables.

The correlation is a measure of the dependence between two random variables. By extension, the correlation between Y1 and Y2 denotes how much information one may expect to obtain about Y1 by measuring Y2, and vice versa. It takes values between −1 and 1, with extreme values (i.e., close to either −1 or 1) denoting stronger dependences. For instance, FIG. 6 shows the time evolution of three variables Y1, Y2, and Y3, which will assume for a moment that they are part of LMs running on three different FARs. As one may observe, Y1 and Y2 look more similar to each other, and indeed their correlation is close to one (0.9258), whereas Y3 is quite different from both Y1 and Y2 with correlations of 0.04 and −0.2, respectively. In this context, there is no point sharing information between the LMs of Y1 and Y3, as they are basically un-related. Conversely, observations of Y2 may be useful to the LM of Y1 because they have strongly correlated dynamics.

Another key embodiment of the techniques herein is the dynamic computation by the DLC of the sharing rate r; although the rate r may be user-defined, it may advantageously be dynamically computed according to the dynamics of the shared variables. As explained above the dynamic computation of clusters is governed by the dynamics of the variables and the correlation between variables used by LMs hosted on a set of FARs. Unfortunately, although knowledge may advantageously be shared by a set of $LM_d$ (distributed LMs), the constrained nature of the Field Area Network makes it not possible in the IoT. Thus, a further input is used by the DLC that consists in taking into account the volume of shared knowledge, the rate of exchange r in light of the available resources. To that end, the DLC is connected to the network forming a passive routing adjacency thus gather the link-state database (LSDB) or routing topology more generally. Additionally the DLC may also gather information on the network resources available for learning sharing between the FAR by from the NMS. For example, since the NMS usually keeps track of the available resources in the network, it may also provide some input to the DLC by explicitly reporting the set of network resources available for paths between FARs. Note that such information could be updated on a regular basis and provided to the DLC in a compressed form of matrix, coupled with policy enforced parameters (although 50 Kbits/s is available between FAR X and FAR Y, do not use more than 10 Kbits/s, mark the corresponding DSCP of the traffic to D1, send between 2 am and 4 am in the morning, etc.).

By taking into account the network available resources, correlation between sharable variables used by the set of LMs, the DLC is capable of computing cluster of FARs that are allowed of sharing knowledge at a rate r.

In yet another embodiment, the DLC may also be used for setting user-defined sharing clusters, obtained from the NMS. Upon creating a new cluster, the DLC sends a message to the FAR that specifies:

1. $L_{shared}$—The list of variables to be shared;
2. $L_{mates}$—the list of FARs to share with; and
3. The rate r at which the data must be sent.

Upon receiving this message, the Orchestration Layer (OL) of the FAR (see, for example, U.S. Provisional Patent Application Ser. No. 61/761,124 entitled "A Pre-Processing Framework Component of Distributed Intelligence Architectures", filed by Dasgupta et al. on Feb. 5, 2013) starts a timer equal to l/r. When the timer is up, the OL reads the variables in $L_{shared}$, and sends them to the FAR in $L_{mates}$. Upon receiving variables from another FAR, the OL transmits them to the LM, which incorporates them in its learning process at the next iteration. For instance, in search heuristics, shared variables are typically a subset of the best-performing candidate solutions of the other FAR. In this case, the LM may simply perform a selection step with its own candidates solutions and those shared by clustered FARs, thus leading to the same number of candidate solutions after the selection.

The set of dynamically computed clusters along with the exchange rate may be provided by the DLC to the FARs using a novel IPv6 message. In one embodiment the DLC may use a set of unicast or dynamically create a set of multicast group of each cluster to keep updating the exchange rate r if the DLC expects to periodically update the value of r according to the network resources.

Another aspect of the techniques herein is a feedback process controlled by hosted LMs to the DLC. Indeed, on top of computing correlation between variables, the DLC may use metrics computed by the LM itself (e.g., the change in variance or in error) for adjusting the various sharing parameters. More generally, this aspect allows the LM to inform the DLC about the relevance and the usefulness of the information shared by others, on a per variable basis.

Figure 7:
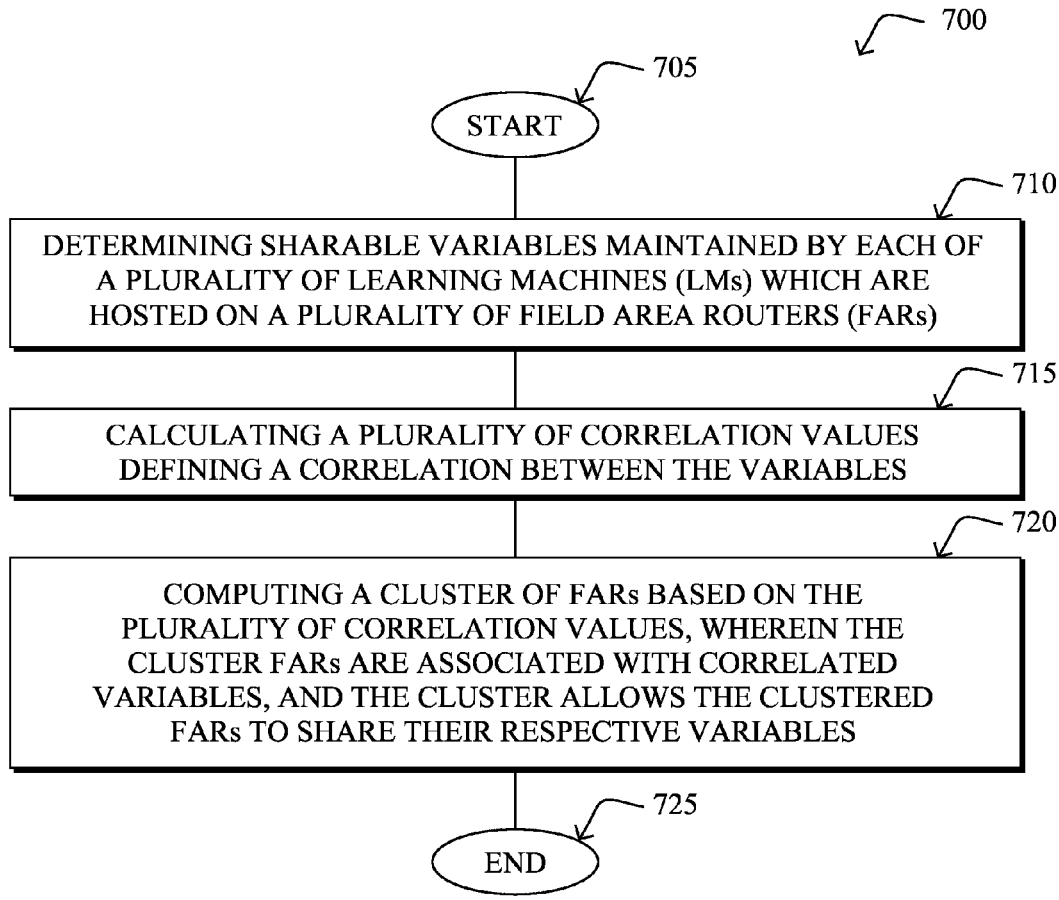
FIG. 7 illustrates an example simplified procedure for accelerated learning by sharing information between multiple learning machines.

FIG. 7 illustrates an example simplified procedure for accelerated learning by sharing information between multiple learning machines. As shown in FIG. 7, the procedure 700 may start at step 705, continue to step 710, and so forth, where, as described in greater detail above, correlated variables are shared between FARs hosting LMs.

At Step 710, the procedure 700 includes determining variables maintained by each of a plurality of LMs, which are hosted on a plurality of FARs in a network. The variables are sharable between the FARs. At Step 715, a plurality of correlation values defining a correlation between the variables. Then, at Step 720, a cluster of FARs based on the plurality of correlation values is computed, such that the clustered FARs are associated with correlated variables are calculated, and the cluster allows the clustered FARs to share their respective variables. The procedure 700 illustratively ends in step 725. The techniques by which the steps of procedure 700 are performed, as well as ancillary procedures and parameters, are described in detail above.

It should be understood that the steps shown in FIG. 7 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for accelerated learning by sharing information between multiple learning machines. In particular, the techniques herein accelerate the convergence and the accuracy of the learning process of local LMs by sharing information that is not FAN-specific. The techniques also offer a flexible architecture for sharing information between FARs while preserving underlying environmental and/or networking constraints.

While there have been shown and described illustrative embodiments that provide for accelerated learning by sharing information between multiple learning machines, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by an agent device, variables maintained by each of a plurality of Learning Machines (LMs), which are hosted on a plurality of Field Area Routers (FARs) in a network, wherein the variables are sharable between the FARs, wherein the plurality of FARs each connect a local area network with a wide area network;
    calculating, by the agent device, a plurality of correlation values defining a correlation between the variables;
    computing, by the agent device, a cluster of FARs based on the plurality of correlation values, wherein the clustered FARs are associated with correlated variables, and the cluster allows the clustered FARs to share their respective variables; and
    sending, from the agent device, a message to each FAR in the computed cluster FAR, the message indicating to each FAR receiving the message that that FAR is in the computer clustered FAR computed by the agent device.

2. The method according to claim 1, further comprising:
    determining whether a correlation value of the plurality of correlation values exceeds a predetermined threshold, wherein the cluster is computed only when the correlation value exceeds the predetermined threshold.

3. The method according to claim 1, wherein the determining of the variables comprises:
    periodically transmitting messages to each FAR to probe the FARs for updated variables.

4. The method according to claim 1, further comprising:
    determining a sharing rate defining a rate at which the variables are shared between the FARs in the cluster of FARs.

5. The method according to claim 4, further comprising:
    determining available network resources in the network, wherein the sharing rate is determined based on the available network resources.

6. The method according to claim 4, further comprising:
    receiving an indication of a user-defined sharing rate, wherein the sharing rate is determined based on the user-defined sharing rate.

7. The method according to claim 1, further comprising:
    dynamically adjusting the cluster based on a network metric.

8. The method according to claim 7, further comprising:
    receiving feedback from a particular LM relating to variables maintained by the particular LM, wherein the network metric is based on the received feedback.

9. The method according to claim 7, further comprising:
    determining available network resources in the network, wherein the network metric is based on the available network resources.

10. An apparatus, comprising:
    one or more network interfaces that communicate with a network;
    a processor coupled to the one or more network interfaces and configured to execute a process; and
    a memory configured to store program instructions which contain the process executable by the processor, the process comprising:
        determining variables maintained by each of a plurality of Learning Machines (LMs), which are hosted on a plurality of Field Area Routers (FARs) in the network, wherein the variables are sharable between the FARs, wherein the plurality of FARs each connect a local area network with a wide area network;
        calculating a plurality of correlation values defining a correlation between the variables;
        computing a cluster of FARs based on the plurality of correlation values, wherein the clustered FARs are associated with correlated variables, and the cluster allows the clustered FARs to share their respective variables; and
        sending a message to each FAR in the computed cluster FAR, the message indicating to each FAR receiving the message that that FAR is in the computer clustered FAR computed by the apparatus.

11. The apparatus according to claim 10, wherein the process further comprises:
    determining whether a correlation value of the plurality of correlation values exceeds a predetermined threshold, wherein the cluster is computed only when the correlation value exceeds the predetermined threshold.

12. The apparatus according to claim 10, wherein the determining of the variables comprises:

periodically transmitting messages to each FAR to probe the FARs for updated variables.

13. The apparatus according to claim 10, wherein the process further comprises:
determining a sharing rate defining a rate at which the variables are shared between the FARs in the cluster of FARs.

14. The apparatus according to claim 13, wherein the process further comprises:
determining available network resources in the network, wherein the sharing rate is determined based on the available network resources.

15. The apparatus according to claim 13, wherein the process further comprises:
receiving an indication of a user-defined sharing rate, wherein the sharing rate is determined based on the user-defined sharing rate.

16. The apparatus according to claim 10, wherein the process further comprises: dynamically adjusting the cluster based on a network metric.

17. The apparatus according to claim 16, wherein the process further comprises:
receiving feedback from an LM relating to variables maintained by the LM, wherein the network metric is based on the received feedback.

18. The apparatus according to claim 16, wherein the process further comprises:
determining available network resources in the network, wherein the network metric is based on the available network resources.

19. A tangible non-transitory computer readable medium storing program instructions that cause a computer to execute a process, the process comprising:
determining variables maintained by each of a plurality of Learning Machines (LMs), which are hosted on a plurality of Field Area Routers (FARs) in a network, wherein the variables are sharable between the FARs, wherein the plurality of FARs each connect a local area network with a wide area network;

calculating a plurality of correlation values defining a correlation between the variables;

computing a cluster of FARs based on the plurality of correlation values, wherein the clustered FARs are associated with correlated variables, and the cluster allows the clustered FARs to share their respective variables; and sending a message to each FAR in the computed cluster FAR, the message indicating to each FAR receiving the message that that FAR is in the computer clustered FAR computed by the agent device.

20. The computer readable medium according to claim 19, further comprising:
determining whether a correlation value of the plurality of correlation values exceeds a predetermined threshold, wherein the cluster is computed only when the correlation value exceeds the predetermined threshold.

* * * * *